Feb. 9, 1932.          C. H. BOYLE           1,844,538
                        CORING DEVICE
                      Filed May 22, 1930
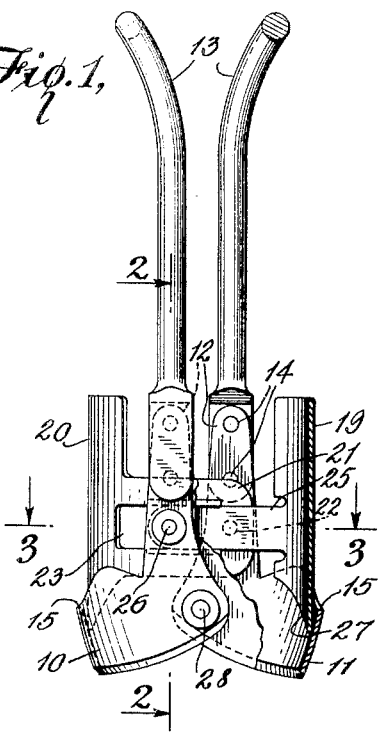
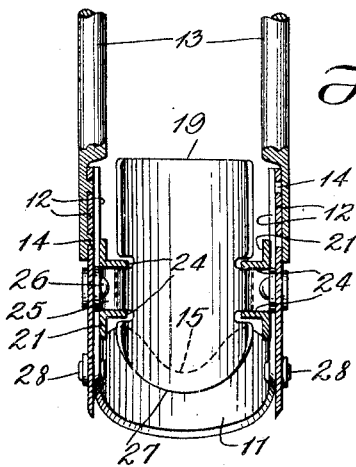
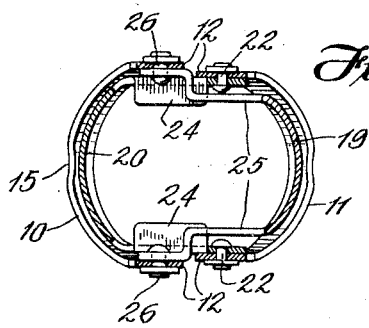
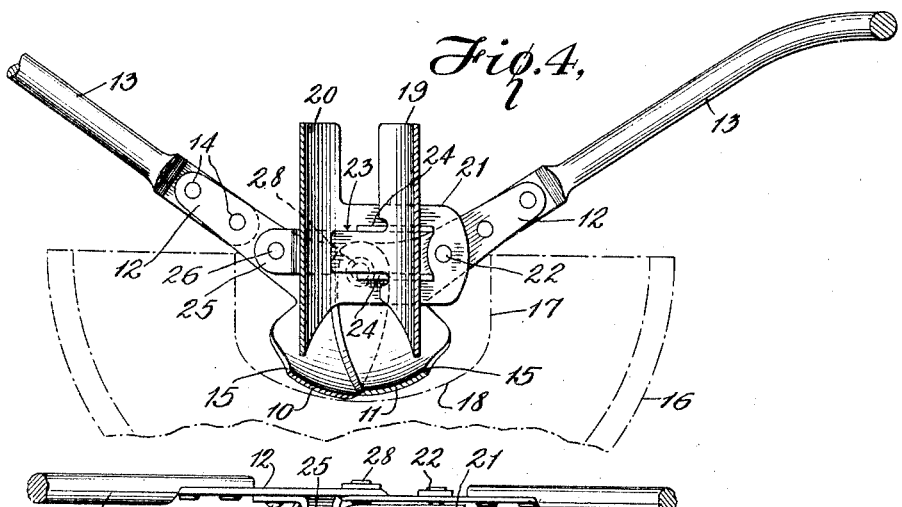
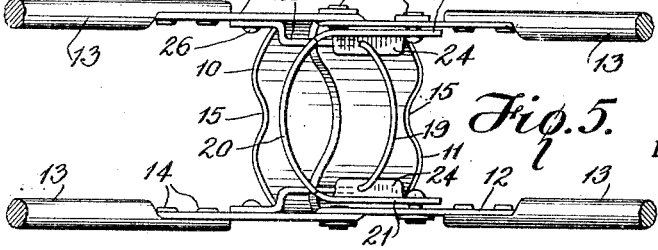
INVENTOR.
CHARLES H. BOYLE
BY
ATTORNEY Patented Feb. 9, 1932

1,844,538

UNITED STATES PATENT OFFICE

CHARLES H. BOYLE, OF NEW HAVEN, CONNECTICUT

CORING DEVICE

Application filed May 22, 1930. Serial No. 454,698.

My invention relates to a new and improved coring device of the type used for coring grapefruit or the like.

Among other aims and objects of the invention may be recited the provision of a device of the character mentioned, wherein the core of the fruit may be severed and removed from the fruit without loss of the juices therein.

With these and other objects in view, as will more fully appear, the invention consists in certain features of novel construction and arrangement of parts as hereinafter described, illustrated in the accompanying drawings, and particularly pointed out, wherein patentable novelty is claimed, it being understood that within the scope of what it claimed, various changes in form, proportion, size and minor details of the construction may be made without departing from the spirit or modifying any of the advantages of the invention.

In the drawings, wherein like characters indicate corresponding parts in the several views:

Figure 1 is a fragmentary view of my improved device with the members in their relative positions as the device is to be projected into the body of the fruit;

Figure 2 is a fragmentary longitudinal sectional view thereof, the parts in section being taken generally upon line 2—2 of Figure 1;

Figure 3 is a transverse sectional view thereof, the parts in section being taken generally upon line 3—3 of Figure 1;

Figure 4 is a fragmentary sectional view of my improved device with the members in the relative position occupied by them as the device is to be withdrawn from the fruit and the core removed; and Figure 5 is another view of the parts when positioned as in Figure 4.

As heretofore made, coring devices have been effective in severing and removing the core from the fruit but with the loss of the juices therein, no means having been provided whereby the same may be extracted and saved. In my improved device the core is not only severed from the fruit but the juices are also extracted from the portion so removed which flow back into the opening in the fruit from which the core was taken.

In the practice of my invention and in one of the many forms in which the device may be constructed, 10 and 11 are companion bowl shaped cutters, having a knife edge at their lower ends and provided on each side with a shank portion 12 with which are connected the bow shaped handle members 13 by rivets 14 or the like.

Equally within the spirit of my invention the handle members 13 and shank members 12 may be made of a single piece of metal. The upper edge of each of the bowl members 10 and 11 are curved inwardly in substantially the center of the width thereof to form the flow lip 15.

In Figure 4 I have outlined by broken lines a portion of a fruit, such as a grapefruit, from which the core is to be removed. To remove the core, the device, with the parts in the position substantially as shown in Figure 1, is placed upon the exposed face of the fruit adjacent to and around the core and then pressed downwardly. This cuts the portion of the fruit around the core substantially upon the lines 17. When pressed inwardly a sufficient distance the handle members 13 are moved upon their pivot mounting 28 until they assume the relative positions as shown in Figure 4. During this latter movement the knife edges on the cutters 10 and 11 cut under the core substantially upon the line 18, thus completely severing the core from the fruit. The core is then removed by lifting the device with the core inside the bowl cutters.

The mechanism associated with this device for extracting the juices from the severed portion of the fruit, comprises companion pressure plates 19 and 20, which are curved outwardly between their side walls and from which project means that cause and maintain the pressure plates to move in substantially parallel planes toward and away from each other.

The arms 21 associated with the plate 20 are hinged to the shank portion 12 by the pintle 22 and each has an opening 23 therethrough, upon the opposite sides of which are the inwardly projecting guide lips 24.

The arms 25 associated with the pressure plate 19 are of substantially the same width as the open space between the plates 24, project through the openings 23 are hinged to the shank member 12 by the pintle 26.

The lower edge 27 of each of these plates 19 and 20 is shaped so as to substantially conform with the curvature of the bowl shaped cutters 10 and 11 and the walls thereof may be perforated if desired to facilitate the escape of juices therethrough. The arrangement of the plates 19 and 20 and their association with the cutters 10 and 11 is such that when the handle members are in substantially the position as shown in Figure 1 the pressure plates are most distant from each other and the lower edges thereof are outside of the cutting edges of each of the cutters 10 and 11. Thus they do not interfere with the progress of the cutters through the body of the fruit as the latter move toward each other. When the arms travel away from each other to the position shown in Figures 3 and 4, the plates 19 and 20 move toward each other in substantially parallel lines. The severed portion of the fruit therebetween is compressed between the plates, and the juices extracted therefrom. These juices then flow downwardly and into the bowl formed by the cutters 10 and 11 and over the flow lip 15 into the open space formed in the fruit where the core has been removed.

As the device is withdrawn from the fruit a very slight tilting thereof in either direction facilitates the discharge of the juices over the flow lip. Thus when the device is withdrawn with the core the latter is removed merely as pulp and without juices. By reversing the position of the device the pulp mass, actuated by gravity, falls from between the pressure plates 19 and 20. This pressure mechanism in addition to extracting the juices from the fruit also facilitates the ready discharge of the removed core because the latter has been compressed and occupies much smaller space than when first severed. That is, the cross sectional area of the compressed juiceless pulp is much less than that of the space between the plates 19 and 20 when positioned as in Figure 1. If desired, the arms 21 and 25 may be hinged to the shank portion 12 upon the same pintle as secures the handle member thereto.

What I claim as new and desire to secure by Letters Patent, is:—

1. A device for severing the core or the like from fruit or the like, wherein cutters are projected into the fruit around the core and then thereunder to completely sever the same from the fruit; and means associated with such cutters for extracting the juices from said core or the like, such means performing its function while the cutters are severing the core or the like from the fruit.

2. A device for severing the core or the like from fruit or the like, having means associated therewith for extracting the juices therefrom, said means comprising in part companion pressure plates that are caused to travel in a path toward and away from each other and thereby compress the core or the like therebetween.

3. A device for severing the core or the like from fruit or the like, having companion cutters that move relatively to each other in a substantially circular path; and means associated therewith for extracting juices from said core or the like, the parts of which move in substantially parallel lines.

4. A device for severing the core or the like from fruit or the like, having companion cutters that move relatively to each other in a substantially circular path; and means associated therewith for extracting juices from said core or the like, the parts of which move in substantially parallel lines, both of said movements being derived through the action of common operating members.

5. A device for severing the core or the like from fruit or the like, having companion cutters that move relatively to each other in a substantially circular path; and means associated therewith for extracting juices from said core or the like, the parts of which move in substantially parallel lines, the toward movement of said means being simultaneous with the movement of the cutters toward each other.

6. A device for severing the core or the like from fruit or the like, having companion cutters that move relatively to each other in a substantially circular path; and means associated therewith that projects above and below the center about which said cutters are movable for extracting juices from said core or the like, the parts of which move in substantially parallel lines.

7. A device for severing and removing the core or the like from fruit or the like having companion cutters that move relatively to each other in a substantially circular path; a pressure plate having a pivotal connection with each of said cutters; and means for causing the pressure plates to travel in substantially parallel lines toward and away from each other during the movement of the cutters.

8. A device for severing the core or the like from fruit or the like, having companion cutters, and associated therewith means for extracting juices therefrom, comprising in part pressure plates that move toward and away from each other during the action of the cutters, each of said plates having arms thereon that have a hinged connection with said cutters.

9. A device for severing the core or the like from fruit or the like, having companion cutters, and associated therewith means for extracting juices therefrom, comprising in part pressure plates that move toward and away from each other during the action of the cutters, each of said plates having arms thereon that have an intermeshing relation with each other and a hinged connection with said cutters.

10. A device for severing the core or the like from fruit or the like, having companion cutters, and associated therewith means for extracting juices therefrom, comprising in part pressure plates that move toward and away from each other during the action of the cutters, each of said plates having arms thereon that have a hinged connection with said cutters, the arms of one of said plates having guide means that co-operate with the arms on the other plate to maintain the plates in a substantially parallel position.

11. A device for severing the core or the like from fruit or the like, having companion substantially spherical shell-like cutters which are relatively of considerable width to conjointly form a bowl of substantial size when the cutting edges lie adjacent to each other; and means, comprising in part pressure plates for extracting the juices from said core, a portion of said plates being substantially opposite the flow lip of the adjacent cutter when the latter are in one of their positions.

12. A device for severing the core or the like from fruit or the like, having companion cutters, and associated therewith means for extracting juices therefrom, comprising in part pressure plates that move toward and away from each other during the action of the cutters, each of said plates having arms thereon that have a hinged connection with said cutters, the arms on one of said cutters having openings through which projects the arms of the other pressure plate.

13. A device for severing the core or the like from fruit or the like, having companion cutters, and associated therewith means for extracting juices therefrom, comprising in part pressure plates that move toward and away from each other during the action of the cutters, each of said plates being curved outwardly and the edges thereof spaced from each other, the arms of one of said plates passing through openings in the arms of the other plate, thereby forming an intermeshing engagement therewith, and also hinged relatively to said cutters.

14. A device for severing the core or the like from fruit or the like, having companion cutters, and associated therewith means for extracting juices therefrom, comprising in part pressure plates that move toward and away from each other during the action of the cutters, each of said plates having arms thereon that have a hinged connection with said cutters, the arms on one of said cutters having openings through which projects the arms of the other pressure plate, and guide ribs adjacent to the walls of said opening and upon opposite sides of the arms of the other pressure plate.

In testimony whereof, I have hereunto affixed my signature.

CHARLES H. BOYLE.